(12) United States Patent
Yanase

(10) Patent No.: US 6,392,871 B1
(45) Date of Patent: *May 21, 2002

(54) PORTABLE COMPUTER SYSTEM WITH ADJUSTABLE DISPLAY SUBSYSTEM

(75) Inventor: Kazuhiro Yanase, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,197

(22) Filed: Oct. 28, 1998

(30) Foreign Application Priority Data

Oct. 30, 1997 (JP) .............................. 9-299212

(51) Int. Cl.[7] .......................... H05K 5/00; G02F 1/1333
(52) U.S. Cl. ........................ 361/681; 361/683; 361/682; 345/905
(58) Field of Search ............................... 361/681, 682, 361/683, 724–727, 686; 353/119, 120, 122; 345/169, 905; 16/342, 337, 303, 319, 332, 336

(56) References Cited

U.S. PATENT DOCUMENTS

| | | | | | |
|---|---|---|---|---|---|
| 5,016,849 A | * | 5/1991 | Wu | .............. | 248/183 |
| 5,052,078 A | * | 10/1991 | Hosoi | .............. | 16/297 |
| 5,175,672 A | * | 12/1992 | Conner et al. | .............. | 361/393 |
| 5,224,060 A | * | 6/1993 | Ma | .............. | 364/708 |
| 5,260,885 A | * | 11/1993 | Ma | .............. | 364/708.1 |
| 5,268,817 A | * | 12/1993 | Miyagawa et al. | .......... | 361/729 |
| 5,276,589 A | * | 1/1994 | Bartlett et al. | .............. | 361/681 |
| 5,337,212 A | * | 8/1994 | Bartlett et al. | .............. | 361/681 |
| D363,471 S | * | 10/1995 | Shima et al. | .............. | D14/106 |
| 5,537,290 A | * | 7/1996 | Brown et al. | .............. | 361/681 |
| 5,559,670 A | * | 9/1996 | Flint et al. | .............. | 361/681 |
| 5,644,469 A | * | 7/1997 | Shioya et al. | .............. | 361/681 |
| 5,657,258 A | * | 8/1997 | Grewe et al. | .............. | 364/708.1 |
| 5,801,919 A | * | 9/1998 | Griencewic | .............. | 361/683 |
| 5,852,545 A | * | 12/1998 | Pan-Ratzlaff | .............. | 361/683 |
| 5,926,364 A | * | 7/1999 | Karidis | .............. | 361/681 |

FOREIGN PATENT DOCUMENTS

| | | |
|---|---|---|
| JP | 6389121 | 6/1988 |
| JP | 467725 | 6/1992 |
| JP | 4-312109 | 11/1992 |
| JP | 5-36523 | 5/1993 |
| JP | 5257568 | 10/1993 |
| JP | 635567 | 2/1994 |
| JP | 695760 | 4/1994 |
| JP | 854962 | 2/1996 |
| JP | 876884 | 3/1996 |
| JP | 9134229 | 5/1997 |

* cited by examiner

Primary Examiner—Leo P. Picard
Assistant Examiner—Anatoly Vortman
(74) Attorney, Agent, or Firm—Ostrolenk, Faber, Gerb & Soffen, LL

(57) ABSTRACT

A portable computer system is provided, which makes it possible to increase the area for an auxiliary device such as a visual indicator and a speaker and to adjust the location and attitude of the auxiliary device with respect to a computer body. This computer system is comprised of a computer body having a first pivot axis, and a display subsystem pivotable connected to the body around the first pivot axis. The display subsystem includes first and second units, one of which is provided with an auxiliary device and the other of which is provided with a display device. The second unit is pivotably connected to the body around the first pivot axis and capable of being held at a desired first pivot angle with respect to the body. The first unit is pivotably connected to the second unit around a second pivot axis and capable of being held at a desired second pivot angle with respect to the second unit. The first pivot axis is located at or near a rear end of the computer body or at a position shifted forward therefrom, and extends along the same rear end. The second pivot axis may be parallel or perpendicular to the first pivot axis.

16 Claims, 9 Drawing Sheets

PORTABLE COMPUTER SYSTEM WITH ADJUSTABLE DISPLAY SUBSYSTEM

BACKGROUND OF THE INVENTION

1. Field of the Invention

The present invention relates to a portable computer system and more particularly, to a portable computer system termed as laptop or notebook-type computer, which is equipped with a display subsystem movably connected to a computer body and an auxiliary device such as a speaker and a visual indicator.

2. Description of the Prior Art

FIG. 1 schematically shows a conventional, typical portable computer system 100 termed a laptop or notebook-type computer. This computer system 100 is comprised of a rectangular-plate-shaped computer body 110 and a rectangular-plate-shaped display subsystem 120 movably attached to the body 110 through two hinges 160. These two hinges 160 are provided at the rear end of the body 110 to be apart from one another.

The computer body 110 includes a keyboard 111, known disk drives and devices (not shown), a visual information indicator 112, and two speakers 113. The indicator 112, which visually displays specific information such as the ON/OFF state of the computer system 100 and the remaining electric power of a built-in battery (not shown), is located at a narrow, elongated area between the hinges 160. In other words, the indicator 112 is located at the curved inter-hinge part of the body 110. The speakers 113 are provided at an unoccupied area 114 of the body 110 between the keyboard 111 and the front end of the body 110. The speakers 113 are apart from one another. The mouths of the speakers 113 are exposed from the area 114, as shown in FIG. 1.

The display subsystem 120 includes a Liquid Crystal Display (LCD) panel 121 to display necessary information on its rectangular screen according to the instructions from a main subsystem (not shown) of the computer system 100. The display subsystem 120, which serves as a lid of the computer system 100, is able to be pivoted forward and backward around a lateral pivot axis formed by the two hinges 160.

When a human operator uses the conventional computer system 100, the system 100 is usually placed on a desk or table, or the operator's laps and then, the display subsystem 120 is pivoted backward around the hinges 160, thereby opening the display subsystem 120. Subsequently, the electric power of the system 100 is turned on to thereby start the computer operation. As a result, specific information is displayed on the screen of the LCD panel 121 provided at the display subsystem 120 and simultaneously, specific information is displayed on the indicator 112 provided at the body 110. Also, specific sounds are emitted by the speakers 113 provided at the body 110 as necessary.

With the conventional portable computer system 100 described above, however, there is a problem that not only the degree of freedom in designing the computer system 100 is low but also usability for the operator is not satisfactory.

Specifically, as shown in FIG. 1, the speakers 113 are located in the unoccupied area 114 of the body 110, in other words, the speakers 113 are located near the front end of the body 110. On the other hand, the operator is opposed to the screen of the LCD panel 121 of the display subsystem 120 near the front end of the body 110. Therefore, the speakers 113 will be excessively near to the operator and accordingly, the operator tends to be difficult to catch the sounds emitted from the speakers 113.

Also, due to this location of the speakers 113, the mouths of the speakers 113 tend to be covered with or closed by the operator's hand or a paper or document prepared by the operator. Thus, the operator tends to be difficult to catch the sounds emitted from the speakers 113 due to this reason.

Additionally, it has been unusual that a speaker is arranged at a narrow area where the operator is difficult to catch the sounds from the speaker, such as the side or rear face of the computer body 110. Therefore, the speaker needs to be very compact.

On the other hand, since the indicator 112 is located at the narrow, elongated area between the hinges 160 in the conventional computer system 100 shown in FIG. 1, the indicator 112 need to be very compact. Thus, not only the location of the indicator 112 but also the geometric shape and size thereof are conspicuously restricted, thereby lowering the degree of freedom in designing the indicator 112.

Moreover, due to the location, shape, and size of the indicator 112, the operator will be difficult to recognize the information visually displayed by the indicator 112.

In recent years, the indicator 112 has been formed by a compact LCD unit capable of displaying various information instead of Light-Emitting Diodes (LEDs). In this case, the characteristic and convenience of the LCD unit are unable to be effectively utilized in the conventional computer system 100.

The Japanese Non-Examined Utility Model Publication No. 5-36523 published in May 1993 discloses a supporting structure for a display unit of a laptop computer. In this structure, the display unit is attached to a computer body by an intermediate supporting member so that the height and angle of the display unit is optionally adjustable with respect to the computer body. The lower end of the supporting member is pivotably connected to the computer body by a first set of hinges, allowing the supporting member to pivot around the axis of the first set of hinges. The upper end of the supporting member is pivotably connected to the display unit by a second set of hinges, allowing the display unit to pivot around the axis of the second set of hinges. The axes of the first and second sets of hinges are typically parallel to one another.

With the conventional supporting structure disclosed in the Japanese Non-Examined Utility-Model Publication No. 5-36523, however, the above-described problem is unable to be solved. This is because this conventional supporting structure is a structure allowing simply the height and angle of the display unit to be adjustable. No reference about speakers and visual indicators is disclosed in this Publication.

Also, in this conventional supporting structure disclosed in the Japanese Non-Examined Utility Model Publication No. 5-36523, when the computer is not used, the angle between the display unit and the intermediate supporting member is set as approximately 180° so that the display unit and the intermediate supporting member extend along the upper surface of the computer body. As a result, there arises a problem that the screen of the display unit becomes narrower due to existance of the intermediate supporting member as long as the size of the computer body is not enlarged.

SUMMARY OF THE INVENTION

Accordingly, an object of the present invention is to provide a portable computer system that makes it possible to increase the area for an auxiliary device such as a visual indicator and a speaker.

Another object of the present invention is to provide a portable computer system in which the location and attitude of an auxiliary device such as a visual indicator and a speaker are adjustable with respect to a computer body.

The above objects together with others not specifically mentioned will become clear to those skilled in the art from the following description.

A portable computer system according to the present invention is comprised of a computer body having a first pivot axis, and a display subsystem pivotably connected to the body around the first pivot axis. The display subsystem includes first and second units, one of which is provided with an auxiliary device and the other of which is provided with a display device. The second unit is pivotably connected to the body around the first pivot axis and capable of being held at a desired first pivot angle with respect to the body. The first unit is pivotably connected to the second unit around a second pivot axis and capable of being held at a desired second pivot angle with respect to the second unit.

With the portable computer system according to the present invention, the auxiliary device such as a visual indicator and a speaker is provided on one of the first and second units of the display subsystem, rather than on a narrow area of the computer body. Therefore, the dedicated area to the auxiliary device is able to be increased compared with the case where the auxiliary device is provided on the computer body.

Also, the second unit of the display subsystem is pivotable around the first pivot axis of the computer body and at the same time, the first unit of the display subsystem is pivotable around the second pivot axis with respect to the second unit and the computer body. Therefore, the location and attitude of the auxiliary device are adjustable with respect to the computer body.

In a preferred embodiment of the portable computer system according to the present invention, the auxiliary device is provided on the second unit of the display subsystem and the display device is provided on the first unit thereof. The first pivot axis of the computer body is located at or near a rear end of the computer body and extends along the same rear end. The second pivot axis may be parallel or perpendicular to the first pivot axis.

In the case where the second pivot axis is perpendicular to the first pivot axis, there is an additional advantage that the orientation of the display device provided at the first unit of the display subsystem is adjustable along a plane parallel to the first pivot axis, which is independent of the orientation of the auxiliary device provided at the second unit of the display subsystem.

In the case where the second pivot axis is parallel to the first pivot axis, there is an additional advantage that the orientation of the display device provided at the first unit of the display subsystem is adjustable along a plane perpendicular to the first pivot axis, which is independent of the orientation of the auxiliary device provided at the second unit of the display subsystem.

In another preferred embodiment of the portable computer system according to the present invention, a top face of the computer body has an unoccupied area. When the second unit of the display subsystem is opposed to the unoccupied area, the whole second unit is received by the unoccupied area.

In this preferred embodiment, a keyboard needs to be located on the computer body to be apart from the rear end of the computer body, so that the unoccupied area may be arranged between the keyboard and the rear end of the body. There is an additional advantage that only the second unit of the display subsystem can be closed while the display device provided at the first unit of the display subsystem is opposed to the operator.

It still another preferred embodiment of the portable computer system according to the present invention, the auxiliary device is provided on the second unit of the display subsystem and the display device is provided on the first unit thereof. The first pivot axis of the computer body is located at a position shifted forward from a rear end of the computer body and extends along the same rear end. The second pivot axis may be parallel or perpendicular to the first pivot axis.

In this preferred embodiment, there is an additional advantage that the dedicated area for the display device provided on the first unit of the display subsystem is able to be increased to the same size of the computer body in spite of existence of the second unit of the display subsystem.

In a further preferred embodiment of the portable computer system according to the present invention, the auxiliary device is provided on the first unit of the display subsystem and the display device is provided on the second unit of the display subsystem. The first axis of the computer body may be located at or near a rear end of the computer body or at a position location shifted forward therefrom and extends along the same rear end. The second axis may be parallel or perpendicular to the first axis of the computer body.

In this embodiment, there is an additional advantage that if the auxiliary divide provided at the first unit is unused, the first unit is able to be closed by turning the first unit backward around the second pivot axis while the second unit is kept open.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENT

Figure 1:
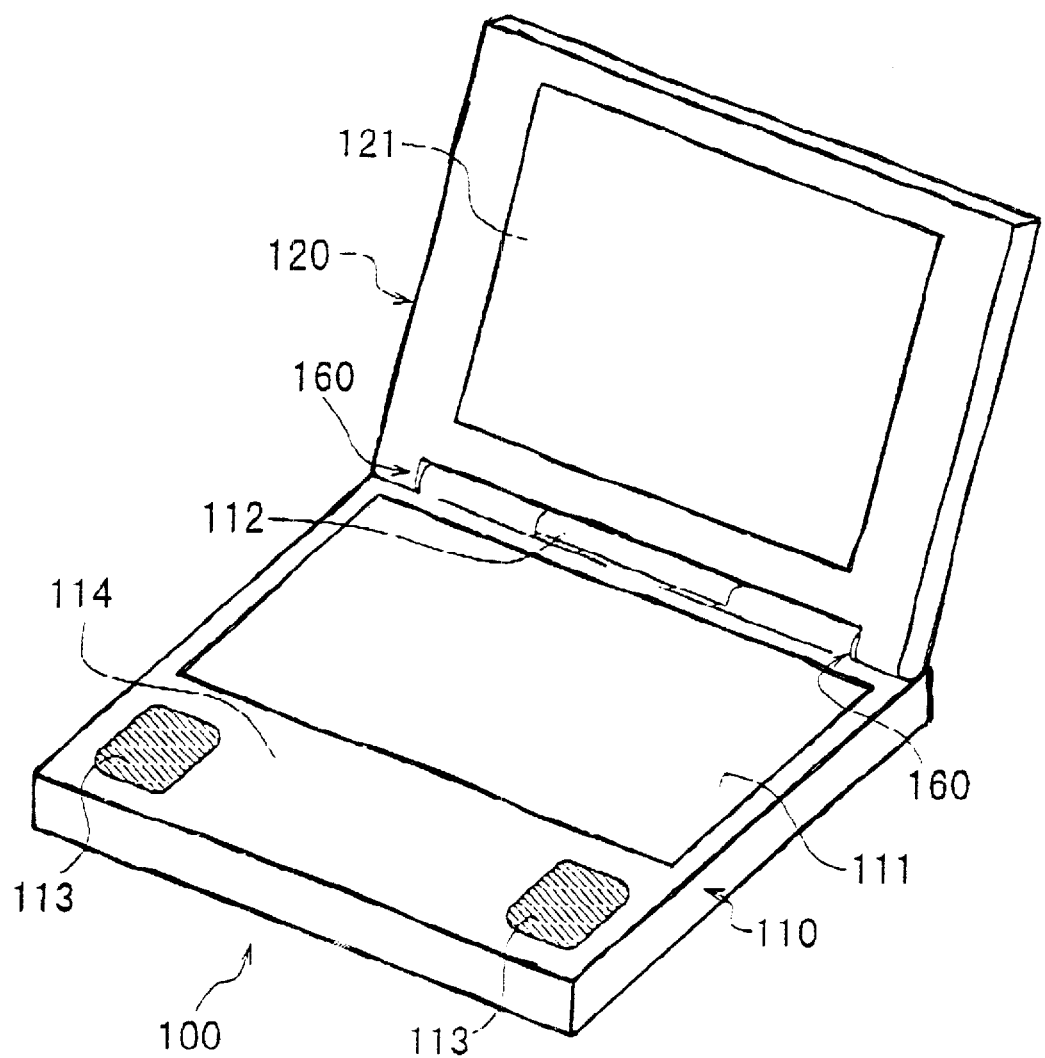
FIG. 1 is a schematic perspective view of a conventional portable computer system.

Preferred embodiments of the present invention will be described below referring to the drawing attached.

FIRST EMBODIMENT

FIGS. 2 to 5 show a portable computer system according to a first embodiment of the present invention, which is called a laptop or notebook-type personal computer.

This portable computer system 1 is comprised of a rectangular-plate-shaped computer body 10 and a rectangular-plate-shaped display subsystem 20 movably attached to the body 10 through two hinges 60. These two hinges 60 are provided at the rear end of the body 10 to be apart from one another.

The computer body 10 is equipped with a keyboard 11 on its upper face and known disk drives and devices (not shown) such as floppy and hard disk drives in its inside. Since this is a very popular configuration in the portable computers of this sort, no detailed explanation is presented here.

The display subsystem 20 is attached to the computer body 10 through two hinges 60 located at the rear end of the body 10, where the hinges 60 from a first pivot axis. Therefore, as shown in FIG. 2, the whole display subsystem 20 is pivotable around the first pivot axis (i.e., the hinges 60) along an arrow a, and can be held at a desired pivot angle θ1 with respect to the upper face of the body 10. This configuration of the display subsystem 20 is similar to the conventional portable computer system 10 shown in FIG. 1, which is popular in the field of portable computer system of this sort.

However, unlike the conventional portable computer system 100, the display subsystem 20 includes first and second rectangular-plate-shaped units 30 and 40 arranged in parallel on a same plane. The first unit 30, which is larger than the second unit 40, is equipped with a LCD panel 31 as a display device for displaying the information or data on its rectangular screen according to the instructions from a main subsystem (not shown) of the portable computer system 1.

The first unit 30 having the LCD panel 31 is not directly attached to the computer body 10 but is indirectly connected to the body 10 through the second unit 40. The lower end of the first unit 30 is pivotably connected to the upper end of the second unit 40 through a connection structure 50 and at the same time, the lower end of the second unit 40 is pivotably connected to the rear end of the computer body 10 through the hinges 60. Thus, the first end second units 30 and 40 of the display subsystem 20 are pivotable around the first pivot axis (i.e., the hinges 60).

Since the connection structure 50 forms a second pivot axis perpendicular to the first pivot axis, the first unit 30 is pivotable around the second pivot axis along an arrow b, as shown in FIG. 2. The second pivot axis is parallel to the first and second units 30 and 40. In other words, the second pivot axis is parallel to the plane where the first and second are arranged. Similar to the second unit 40, the first unit 30 can be fixed at a desired pivot angle θ2 with respect to the second unit 40.

The second unit 40 is equipped with a visual indicator 41 for visually displaying specific auxiliary information such as the ON/OFF state of the computer system 1, and the remaining electric power of a built-in battery (not shown) of the computer system 1, and two speakers 42 for emitting specific auxiliary sounds such as alarms to the operator. The auxiliary information is visually displayed on the indicator 41 and the auxiliary sounds are emitted by the speakers 42 according to the instructions from the main subsystem of the computer system 1.

Here, the visual indicator 41 is formed by a small LCD panel with a rectangular screen extending along the rear end (or, the first pivot axis) of the computer body 10. The two speakers 41 are located at the right and left sides of the indicator 41, respectively.

Thus, the visual indicator 41 and the speakers 42 are provided on the second unit 40 of the display subsystem 20, in other words, the visual indicator 41 and the speakers 42 are provided in a specific area dedicated thereto. Accordingly, a wide area is ensured for the visual indicator 41 and the speakers 42 and a higher degree of freedom becomes possible in designing them. This makes it possible for an user or operator of this computer system 1 to readily recognize the displayed information on the indicator 41 and to readily listen to the emitted sounds from the speakers 42.

It is needless to say that the visual indicator 41 may display any information other than the auxiliary information such as the ON/OFF state and the remaining electric power of the built-in battery. Since the visual indicator 41 is formed by the small LCD panel in the first embodiment, there is an additional advantage that more information may be displayed on its screen compared with the case where LEDs are used for the indicator 41 instead of the LCD panel. For example, approximately the same information as that displayed on the display device 31 or any other information may be displayed on the indicator 41.

Figure 5:
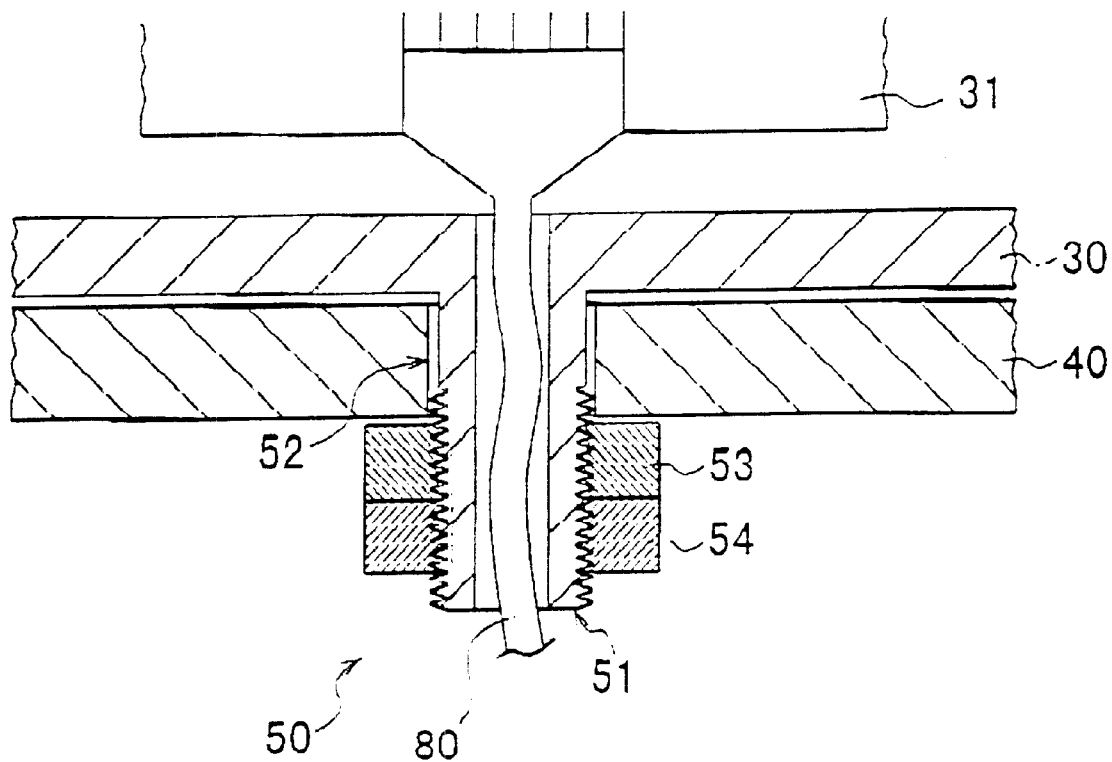
FIG. 5 is a schematic cross-sectional view showing the connection structure provided between the first and second units of the display subsystem in the portable computer system according to the first embodiment of FIG. 2.

The detailed configuration of the connection structure 50, which forms the second pivot axis, is shown in FIG. 5.

As shown in FIG. 5, a screwed tubular part 51 is formed at the middle of the lower end of the first unit 30. The tubular part 51, which has a screw on its outer face, is protruded from the lower end of the first unit 30, toward the second unit 40. On the other hand, a cylindrical hole 52 is formed at the middle of the upper end of the second unit 40. The tubular part 51 is inserted into the cylindrical hole 52 so that the lower end of the part 51 is protruded into the inside of the second unit 40. Two nuts 53 and 54 are engaged with the screw formed on the outer face of the tubular part 51, thereby pivotably connecting the first unit 30 to the second unit 40 along the arrow b.

A set of wiring cables 80, which are electrically connected to the main subsystem of the computer 1 provided in the computer body 10 through the second unit 40, are inserted into the first unit 30 through the tubular part 51. Then, the set of wiring cables 80 are electrically connected to the LCD panel 31 provided in the first unit 30.

Figure 3:
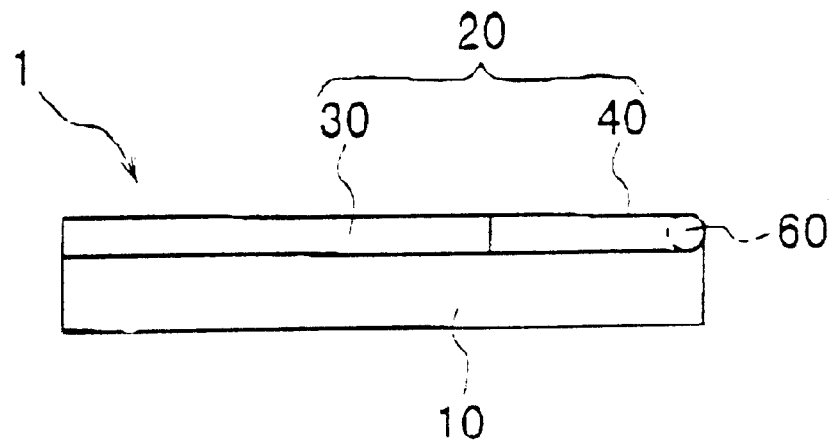
FIG. 3 is a schematic side view of the portable computer system according to the first embodiment of FIG. 2, which shows the state where the display subsystem is closed.
Figure 4:
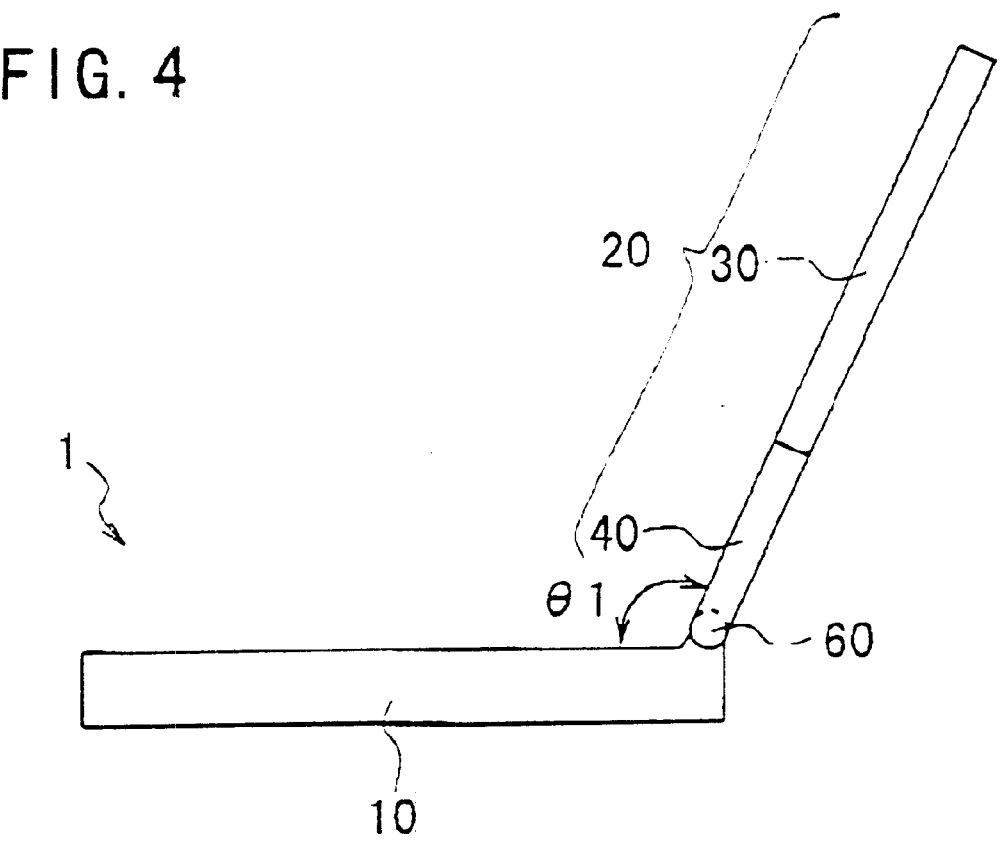
FIG. 4 is a schematic side view of the portable computer system according to the first embodiment of FIG. 2, which shows the state where the display subsystem is open.

Next, the use of the portable computer system 1 according to the first embodiment is explained below with reference to FIGS. 3 and 4.

When the computer system 1 is not used, the whole display subsystem 20 is pivoted forward around the first pivot axis (i.e., the hinges 60) toward the upper face of the computer body 10 until the front face of the display subsystem 20 is contacted with the upper face of the body 10. Thus, the display subsystem 20 is closed, as shown in FIG. 3.

On the other hand, when a human operator uses the computer system 1, the system 1 is placed on a desk or table or the operator's laps. Next, to open the display subsystem 20, the whole display subsystem 20 is pivoted backward around the first pivot axis by the operator and then, it is held at a desired pivot angle $\theta 1$ with respect to the upper face of the body 10, as shown in FIG. 4. At this stage, not only the first unit 30 having the LCD panel 31 but also the second unit 40 having the visual indicator 41 and the speakers 42 are fixed at the desired pivot angle $\theta 1$ while they are opposed to the operator. Therefore, the operator readily recognizes the information displayed on the display device 31 but also the displayed on the indicator 41. Further, the operator readily listens to the sounds emitted by the speakers 42.

Also, by adjusting the pivot angle $\theta 1$ of the display subsystem 20 or second unit 40, the position (or, height) and orientation of the indicator 41 and the speakers 42 can be set at the optimized location for the operator.

Moreover, because only the first unit 30 can be pivoted around the second pivot axis (i.e., the connection structure 50) independent of the second unit 40, the display device 31 on the first unit 30 can be opposed to another person while the indicator 41 and the speakers 42 on the second unit 40 are opposed to the operator. Therefore, this embodiment is preferred to the case where the same or similar information is displayed on the display device 31 and the indicator 41.

Figure 2:
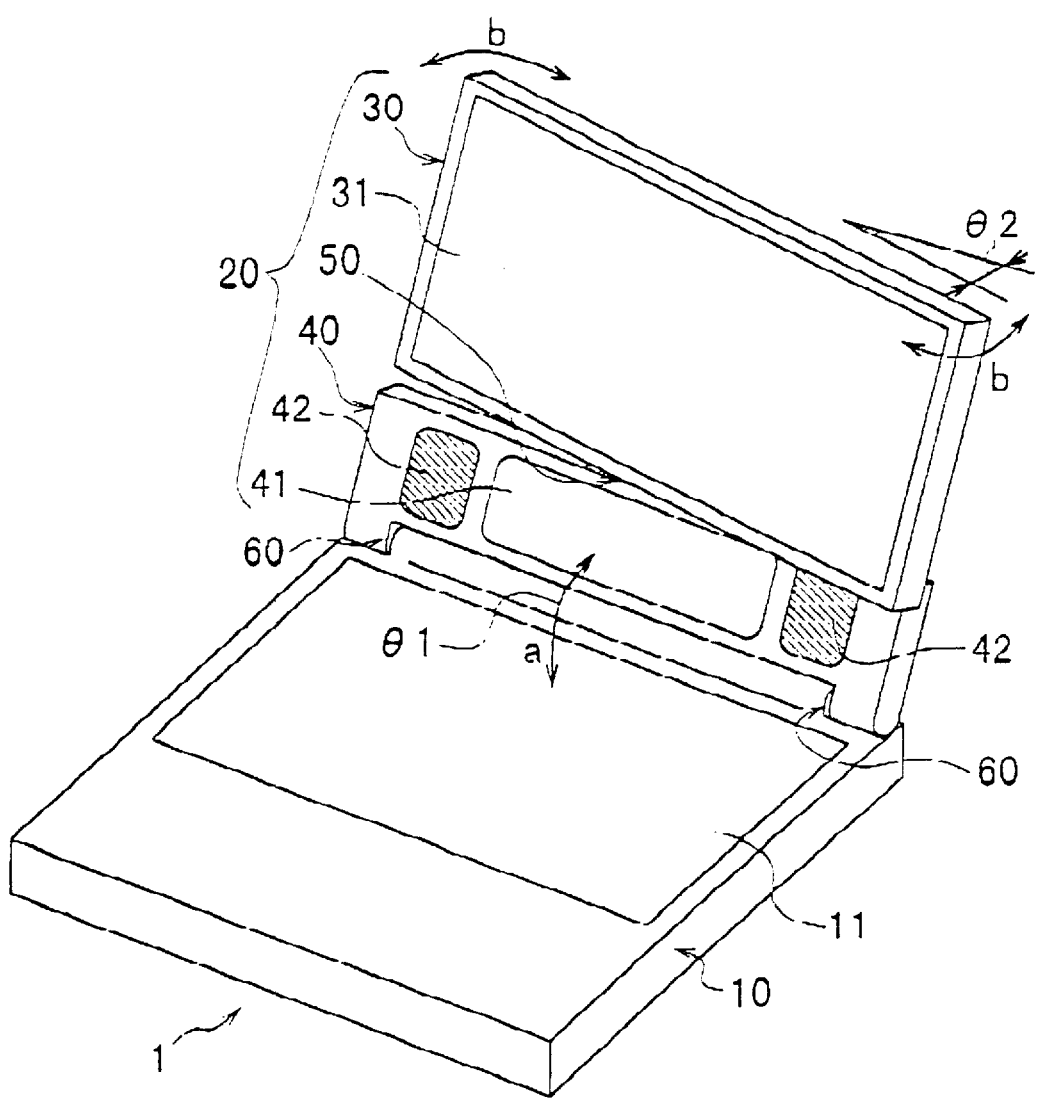
FIG. 2 is a schematic perspective of a portable computer system according to a first embodiment of the present invention.

As described above, with the portable computer system 1 according to the first embodiment, since the visual indicator 41 and the speakers 42 as the auxiliary devices are provided on the second unit 40 of the display subsystem 20, rather than on a narrow area of the computer body 10, the dedicated area to the visual indicator 41 and the speakers 42 is able to be increased compared with the conventional portable computer system 100 shown in FIG. 1 where the visual indicator 112 and the speakers 123 are provided on the computer body 110.

Also, the second unit 40 of the display subsystem 20 is pivotable around the first pivot axis (i.e., the hinges 60) of the computer body 10 and at the same time, the first unit 30 of the display subsystem 20 is pivotably attached to the second unit 40 around the second axis (i.e., the connection structure 50) with respect to the second unit 40 and the computer body 10. Therefore, the location and attitude of the visual indicator 41 and the speakers 42 are adjustable with respect to the body 10.

SECOND EMBODIMENT

Figure 6:
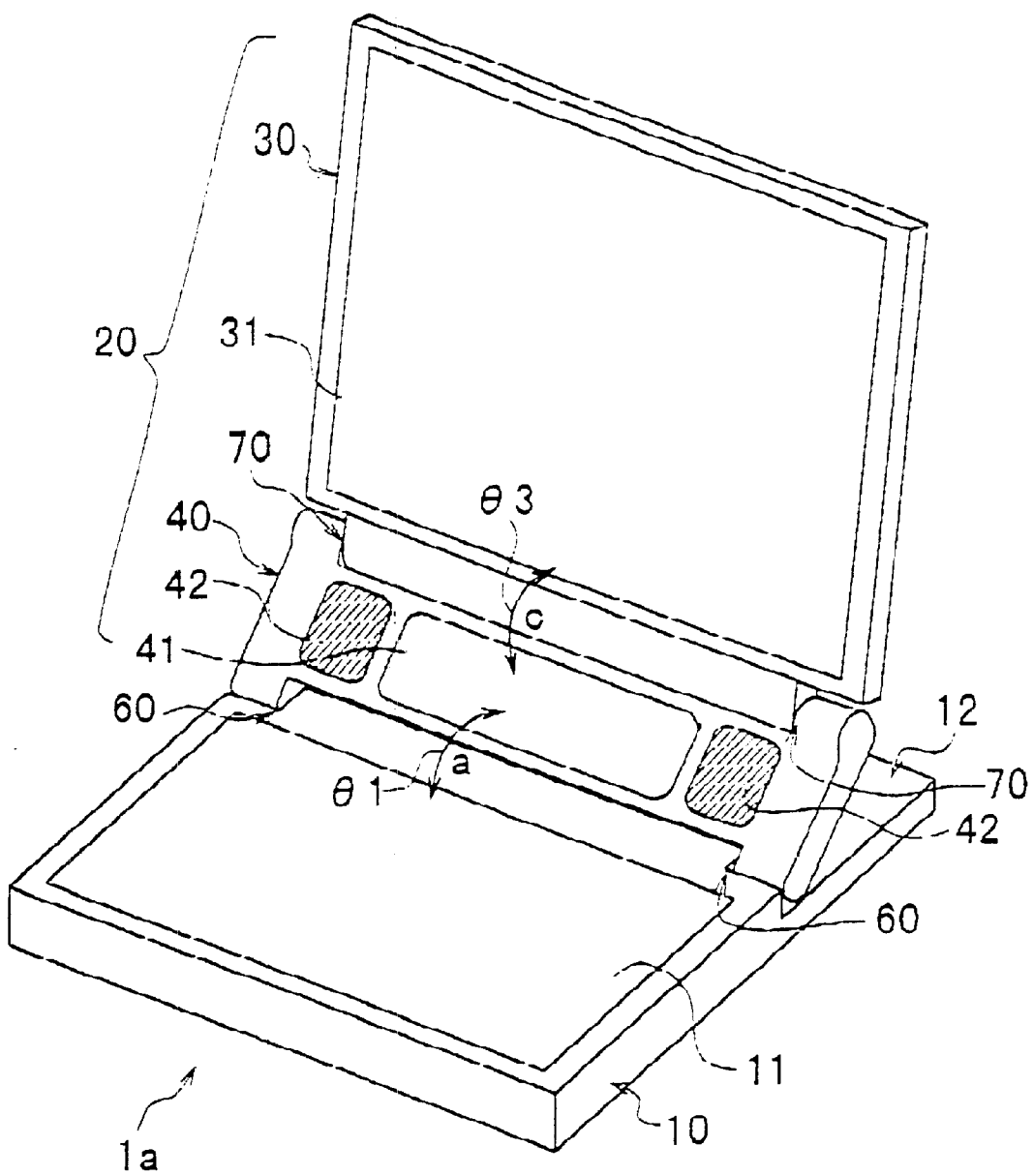
FIG. 6 is a schematic perspective view of a portable computer system according to a second embodiment of the present invention.
Figure 7:
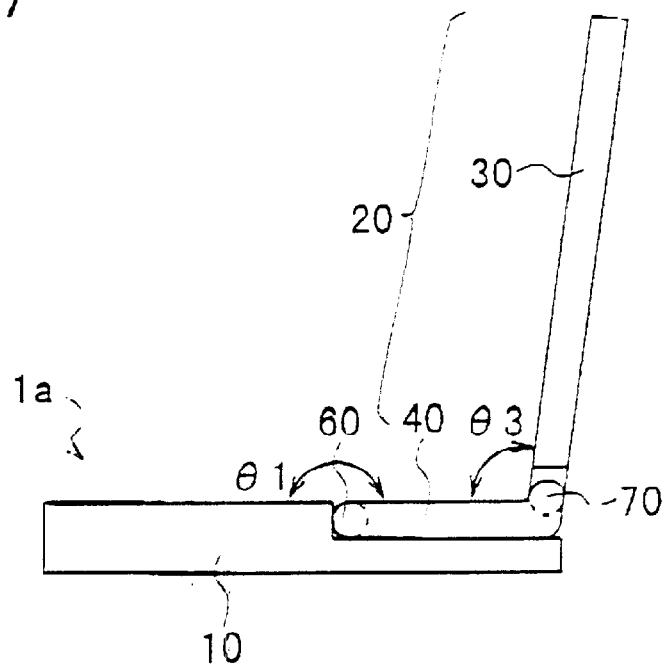
FIG. 7 is a schematic side view of the portable computer system according to the second embodiment of FIG. 6, which shows the state where the second unit (i.e., the auxiliary device) of the display subsystem is closed and the first unit (i.e., the display device) thereof is open.
Figure 8:
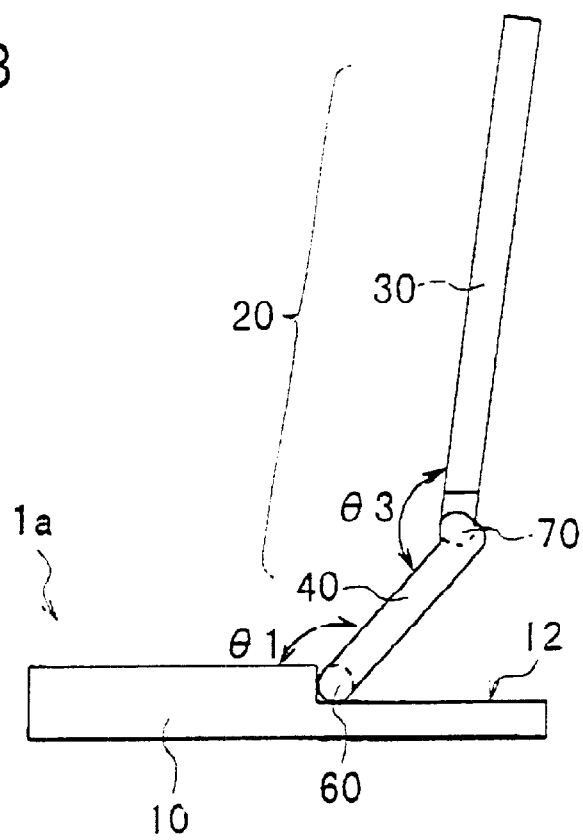
FIG. 8 is a schematic side view of the portable computer system according to the second embodiment of FIG. 6, which shows the state where both the first and second units of the display subsystem are open.

FIGS. 6 to 8 show a portable computer system 1a according to a second embodiment of the present invention.

The computer system 1a according to the second embodiment has the same configuration as the computer system 1 according to the first embodiment except that (a) two hinges 70 are used for pivotably connecting the first unit 30 to the second unit 40 instead of the connection structure 50 in the first embodiment, and the (b) the hinges 60 are shifted toward the front end of the computer body 10. The hinges 60 are located approximately the middle of the body 10. Therefore, the explanation about the same configuration is omitted here by attaching the same reference symbols as those in the first embodiment to the same elements in FIGS. 6 to 8 for the sake of simplication.

Since the lower end of the first unit 30 of the display subsystem 20 is connected to the upper end of the second unit 40 thereof with the two hinges 70 similar to the hinges 60, the hinges 70 form a third pivot axis. Therefore, as shown in FIG. 6, the first unit 30 is pivotable along an arrow c around the third pivot axis (i.e., the hinges 70) parallel to the first pivot axis (i.e., the hinges 60). Also, similar to the second unit 40, the first unit 30 can be held at a desired pivot angle $\theta 3$ with respect to the second unit 40. Thus, the first unit 30 is pivotable along a vertical plane downward and upward with respect to the second unit or the computer body 10.

Unlike the portable computer system 1 according to the first embodiment, a depressed area 12 is formed at the top face of the computer body 10, which has a same depth as the thickness of the second unit 40 of the display subsystem 20 and a same plan shape as that of the second unit 40. The hinges 60 (i.e., the first pivot axis) are located at the front end of the depressed area 12, i.e., the approximately middle of the body 10. Therefore, when the second unit 40 is pivoted backward around the third pivot axis until the rear face of the unit 40 is contacted with the top face of the area 12, the depressed area 12 is be filled with the second unit 40, in other words, the second unit 40 is fitted into the area 12, as shown in FIG. 7.

At the state of FIG. 7, the front face of the second unit 40 is in approximately the same level as the upper face of the computer body 10.

When the second unit 40 is pivoted forward around the first pivot axis (i.e., the hinges 60) and the first unit 30 is pivoted backward around the third pivot axis (i.e., the hinges 70) and then, the first and second units 30 and 40 are held at the desired pivot angles $\theta 3$ and $\theta 1$ with respect to the upper face of the body 10 and the front face of the second unit 40, respectively. The position and orientation of the first and second units 30 and 40 may be optionally adjusted as required. The state at this stage is shown in FIG. 8.

When the computer system 1a is not used, the whole display subsystem 20 is pivoted forward around the hinges 70 (i.e., the third pivot axis) until the front face of the display subsystem 20 is contacted with the upper face of the computer body 10. This state is approximately the same as shown in FIG. 3.

As described above, with the portable computer system 1a according to the second embodiment, the hinges 60 (i.e., the first pivot axis) of the computer body 10 is shifted forward and is located at the approximately middle of the computer body 10. Therefore, in addition to the same advantages as those in the first embodiment, there is an additional advantage that the first unit 30 of the display subsystem 20 has a same wide area as that of the whole computer body 10 while the second unit 40 of the display subsystem 20 is provided. This means that the first unit 30 (i.e., the screen of the LCD panel 31) of the computer system 1a according to the second embodiment is wider than that of the computer system 1 according to the first embodiment.

THIRD EMBODIMENT

Figure 9:
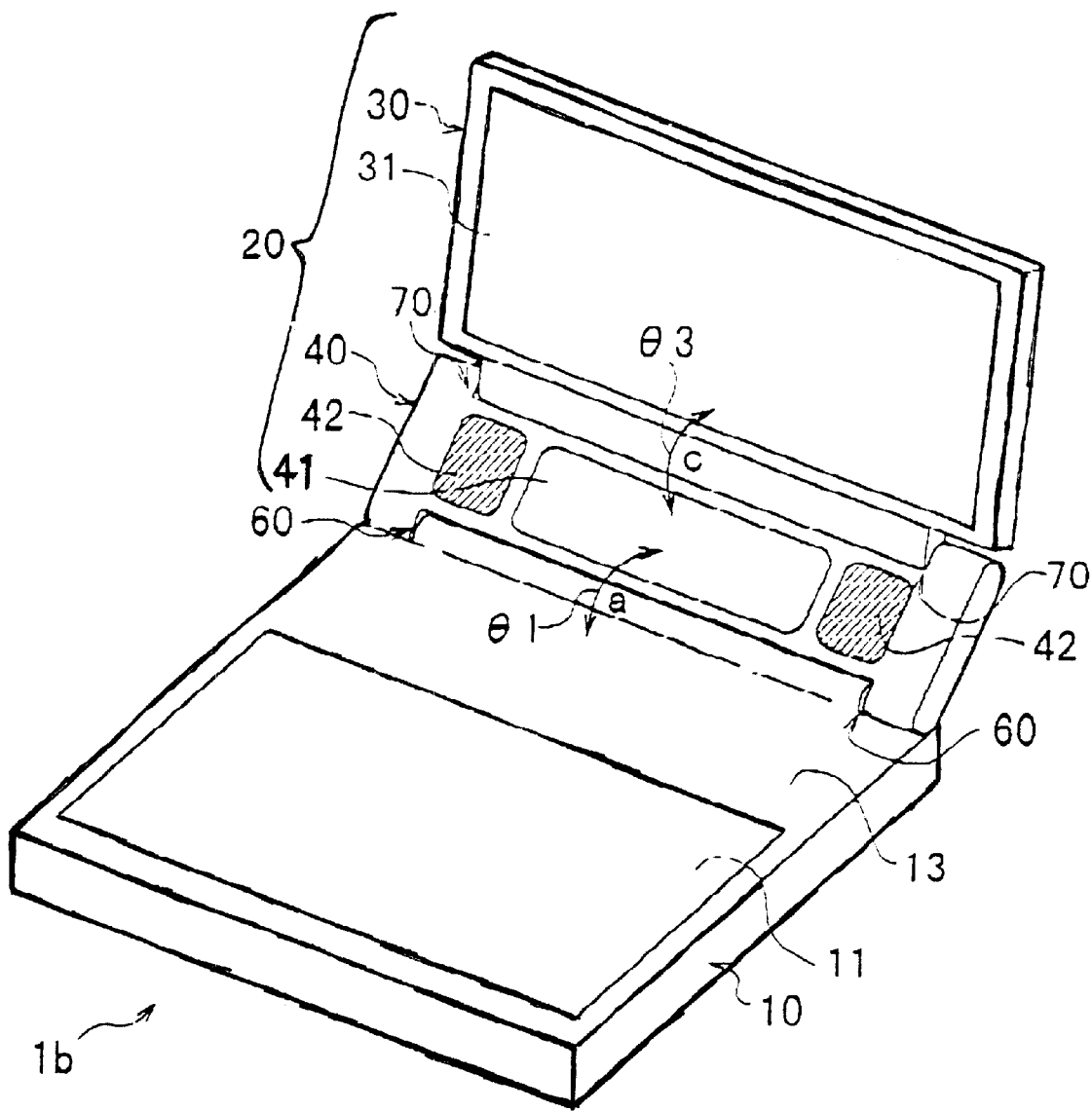
FIG. 9 is a schematic perspective view of a portable computer system according to a third embodiment of the present invention.
Figure 10:
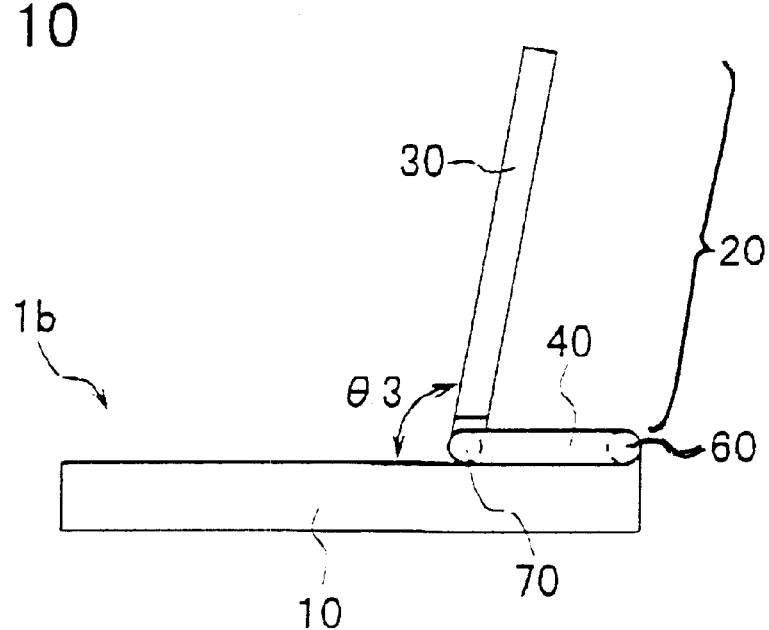
FIG. 10 is a schematic side view of the portable computer system according to the third embodiment of FIG. 9, which shows the state where the first unit (i.e., the auxiliary device) of the display subsystem is closed and the second unit (i.e., the display device) thereof is open.
Figure 11:
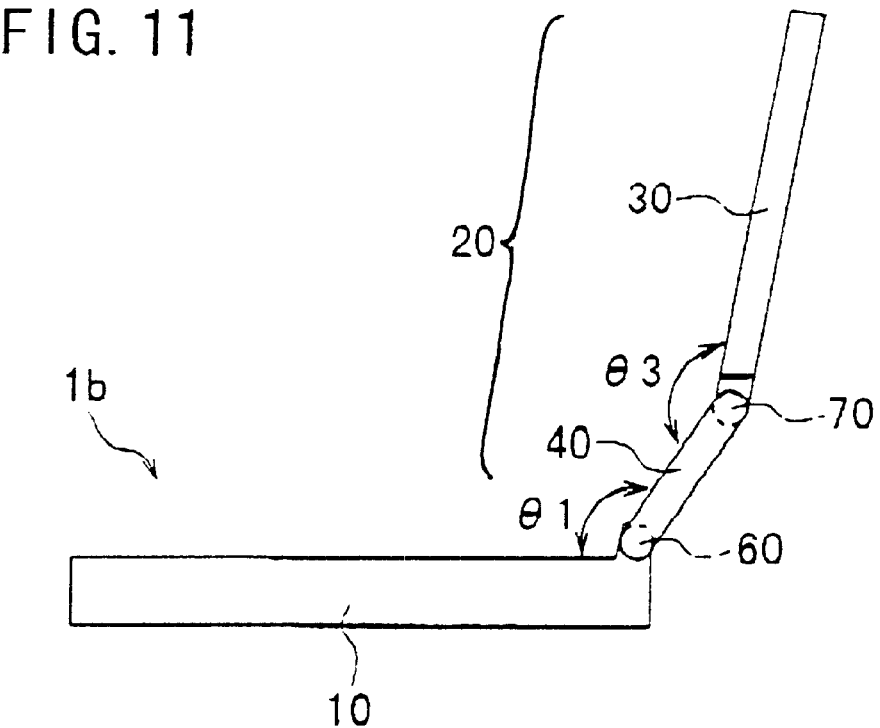
FIG. 11 is a schematic side view of the portable computer system according to the third embodiment of FIG. 9, which shows the state where both the first and second units of the display subsystem are open.

FIGS. 9 to 11 show a portable computer system 1b according to a third embodiment of the present invention.

The computer system 1b according to the third embodiment has the same configuration as the computer system 1 according to the first embodiment except that (a) the connection structure 50 in the first embodiment is replaced with the hinges 70 used in the second embodiment to pivotably connect the first unit 30 to the second unit 40, and that (b) the keyboard 11 is shifted forward as to be located at the front end of the computer body 10. Therefore, the explanation about the same configuration is omitted here by attaching the same reference symbols as those in the first embodiment to the same elements in FIGS. 9 to 11 for the sake of simplification.

When the computer system 1b is not used, the whole display subsystem 20 is pivoted forward around the hinges 60 (i.e., the first pivot axis) until the front face of the display subsystem 20 is contacted with the upper face of the computer body 10. This state is approximately the same as shown in FIG. 3.

When the operator uses the computer 1b, in one case, as shown in FIG. 7, only the first unit 30 of the display subsystem 20 is pivoted backward around the hinges 70 (i.e., the third pivot axis) to open the display device 31 on the first unit 30 and then, it is held at the desired pivot angle θ3 between the front face of the first unit 30 and the upper face of the computer body 10. At this stage, the second unit 40 having the indicator 41 and the speakers 42 is closed and at the same time, only the first unit 30 is opposed to the operator. In this case, the operator is able to readily recognize the information displayed on the LCD panel 31 of the first unit 30 without looking at the information displayed on the indicator 41 of the second unit 40.

In the state shown in FIG. 10, the second unit 40 of the display subsystem 20 is opposed to a rectangular unoccupied area 13 of the computer body 10. The area 13 is located between the keyboard 11 and the rear end of the body 10. Due to this configuration, the keyboard 11 is available even when only the second unit 40 is closed, as shown in FIG. 10.

In another case, as shown in FIG. 11, not only the first unit 30 is pivoted backward around the hinges 70 but also the second unit 40 is pivoted backward around the hinges 60. Then, they are held at the desired pivot angles θ3 and θ1.

By adjusting the pivot angles θ1 and θ3, the position and orientation of the screen of the LCD panel 31 on the first unit 30 and the indicator 41 and the speakers 42 provided on the second unit 40 can be set at the optimized locations for the operator, respectively.

There is an additional advantage that the indicator 41 and the speakers 42 on the second unit 40 of the display subsystem 20 can be closed according to the intention of the operator, as shown in FIG. 10.

FOURTH EMBODIMENT

Figure 12:
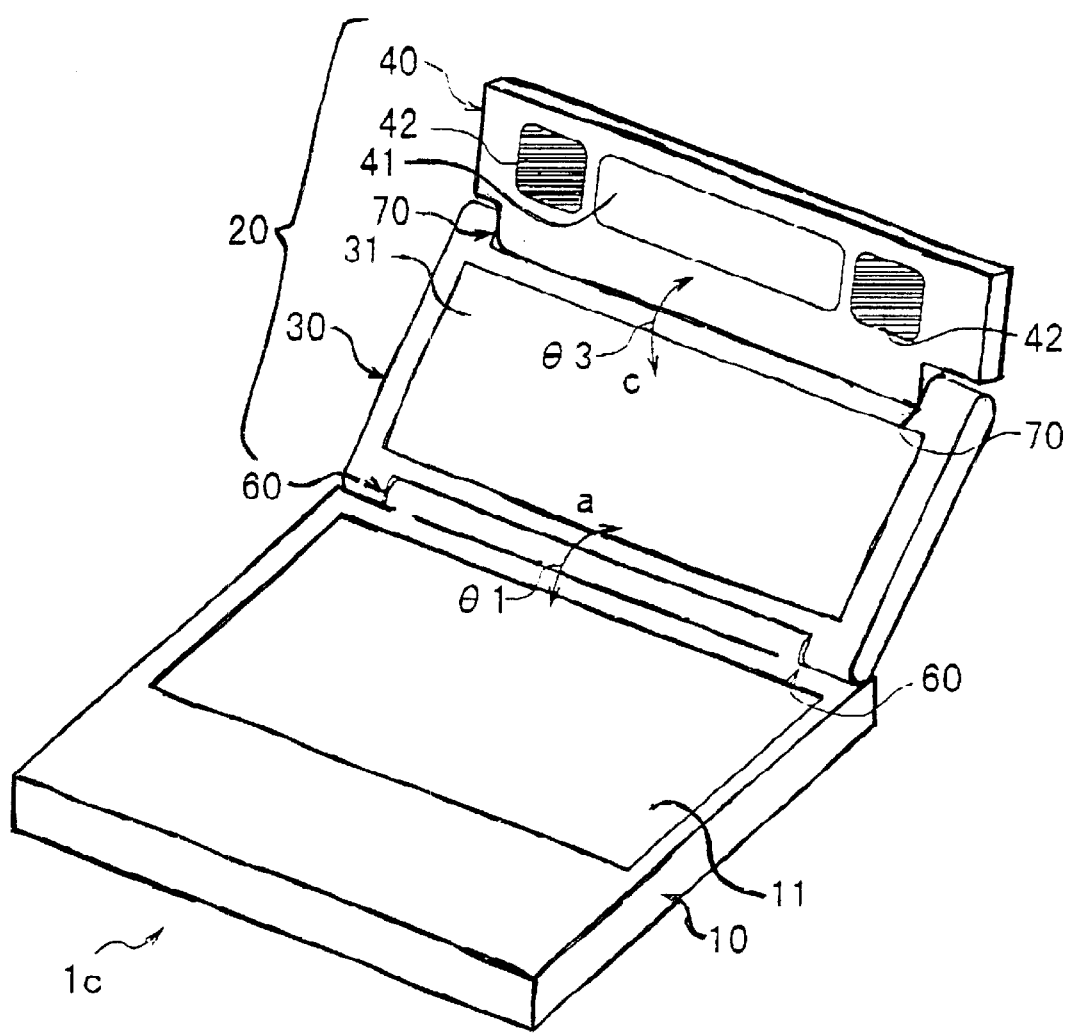
FIG. 12 is a schematic perspective view of a portable computer system according to a fourth embodiment of the present invention.

FIG. 12 shows a portable computer system 1d according to a fourth embodiment of the present invention.

The computer system 1d according to the fourth embodiment has the same configuration as the computer system 1 according to the first embodiment except that the first unit 30 having the LCD panel 31 is pivotably connected to the rear end of the computer body 10 through the hinges 60 and the second unit 40 having the visual indicator 41 and the speakers 42 is pivotably connected to the first unit 30 through the hinges 70. Therefore, the detailed explanation is omitted here for the sake of simplification.

In the computer system 1d according to the fourth embodiment, there is an additional advantage that if the indicator 41 provided at the second unit 40 is not necessary, the second unit 40 is able to be closed by turning the second unit 40 backward around the third pivot axis (i.e., the hinges 70) while the first unit 30 is kept open.

In the above-described first to fourth embodiments, the visual indicator 41 and the speakers 42 are provided on the second unit 40 of the display subsystem 20 as samples of the auxiliary devices. However, it is needless to say that the present invention is not limited to these cases. Any other type of the auxiliary devices may be used for the present invention as necessary.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A portable computer system comprising:
    a computer body having a first pivot axis, a lower surface substantially coextensive in length and width with said computer body and a top face including a keyboard, said top face being opposed to and covering substantially all of said lower surface;
    a display subsystem pivotably connected to said body around said first pivot axis;
    said display subsystem including first and second units, one of which is provided with an auxiliary electronic device and the other of which is provided with a display device;
    said second unit being pivotably connected to said body around said first pivot axis and capable of being held at a desired first pivot angle with respect to said body;
    said first unit being pivotably connected to said second unit around a second pivot axis and capable of being held at a desired second pivot angle with respect to said second unit; and
    said first and second units together being substantially coextensive in length and width with said computer body so that said first and second units may be pivoted to a position in which said first and second units cover all of the top face of said computer body.

2. The computer system as claimed in claim 1, wherein said display device displays first information and said auxiliary device comprises a visual indicator adapted to displaying second information, said second information being the same or different than said first information.

3. The computer system as claimed in claim 1, wherein said auxiliary electronic device is provided on said first unit of said display subsystem and said display device is provided on said second unit of said display subsystem.

4. The computer system as claimed in claim 3, wherein said first axis of said computer body is be located at or near a rear end of said computer body and extends along the same rear end.

5. The computer system as claimed in claim 1, wherein said auxiliary device is provided on said second unit of said display subsystem and said display is provided on said first unit thereof;
    and wherein said first pivot axis of said computer body is located at or near a rear end of said computer body and extends along the same rear end.

6. The computer system as claimed in claim 5, wherein said second pivot axis is perpendicular to said first pivot axis.

7. A portable computer system comprising:
    a computer body having a first pivot axis, a lower surface substantially coextensive in length and width with said computer body and a top face including a keyboard, said top face being opposed to and covering substantially all of said lower surface;

a display subsystem pivotably connected to said body around said first pivot axis;

said display subsystem including first and second units, and first unit being provided with a display device and said second unit being provided with an auxiliary electronic device;

said second unit being pivotably connected to said body around said first pivot axis and capable of being held at a desired first pivot angle with respect to said body, and first pivot axis of said computer body being located at or near a rear end of said computer body and extending along the same rear end;

said first unit being pivotably connected to said second unit around a second pivot axis and capable of being held at a desired second pivot angle with respect to said second unit, said second pivot axis being parallel to said first pivot axis; and said first and second units together being substantially coextensive in length in width with said computer body so that said first and second units may be pivoted to a position in which said first and second units cover all of the top face of said computer body.

8. The computer system as claimed in claim 7, wherein said display device displays first information and said auxiliary device comprises a visual indicator adapted to displaying second information, said second information being the same or different than said first information.

9. A portable computer system comprising:

a computer body having a first pivot axis a lower surface substantially coextensive in length and width with said computer body and a top face including a keyboard, said top face being opposed to and covering substantially all of said lower surface;

a display subsystem pivotably connected to said body around said first pivot axis;

said display subsystem including first and second units, one of which is provided with an auxiliary electronic device and the other of which is provided with a display device;

said second unit being pivotably connected to said body around said first pivot axis and capable of being held at a desired first pivot angle with respect to said body; and said first unit being pivotably connected to said second unit around a second pivot axis and capable of being held at a desired second pivot angle with respect to said second unit, wherein said auxiliary electronic device is provided on said second unit of said display subsystem and said display device is provided on said first unit thereof;

wherein said first pivot axis of said computer body is located at a position shifted forward from a rear end of said computer body and extends along the same rear end; and said first and second units together being substantially coextensive in length and width with said computer body so that said first and second units may be pivoted to a position in which said first and second units cover all of the top face of said computer body.

10. The computer system as claimed in claim 9, wherein said second pivot axis is perpendicular to said first pivot axis.

11. The computer system as claimed in claim 9, wherein said display device displays first information and said auxiliary device comprises a visual indicator adapted to displaying second information, said second information being the same or different than said first information.

12. A portable computer system comprising:

a computer body having a first pivot axis, a lower surface substantially coextensive in length and width with said computer body and a top face including a keyboard, said top face being opposed to and covering substantially all of said lower surface;

a display subsystem pivotably connected to said body around said first pivot axis;

said display subsystem including first and second units, one of which is provided with an auxiliary electronic device and the other of which is provided with a display device;

said second unit being pivotably connected to said body around said first pivot axis and capable of being held at a desired first pivot angle with respect to said body; and said first unit being pivotably connected to said second unit around a second pivot axis and capable of being held at a desired second pivot angle with respect to said second unit, wherein the top face of said computer body has an unoccupied area;

wherein when said second unit of said display subsystem is opposed to said unoccupied area, said whole second unit is received by said unoccupied area; and said first and second units together being substantially coextensive in length and width with said computer body so that said first and second units may be pivoted to a position in which said first and second units cover all of the top face of said computer body.

13. The computer system as claimed in claim 12, wherein a keyboard is located on said computer body to be apart from said rear end of said computer body, so that said unoccupied area is arranged between said keyboard and said rear end of said body.

14. The computer system as claimed in claim 13, wherein said display device displays first information and said auxiliary device comprises a visual indicator adapted to displaying second information, said second information being the same or different than said first information.

15. A portable computer system comprising:

a computer body having a first pivot axis a lower surface substantially coextensive in length and width with said computer body and a top face including keyboard, and top face being opposed to and covering substantially all of said lower surface;

a display subsystem pivotably connected to said body around said first pivot axis;

said display subsystem including first and second units, said first unit being provided with an auxiliary electronic device and said second unit being provided with a display device;

said second unit being probably connected to said body around said first pivot axis and capable of being held at a desired first pivot angle with respect to said body; and said first unit being pivotably connected to said second unit around a second pivot axis and capable of being held at a desired second pivot angle with respect to said second unit, wherein said first axis of said computer body is be located at a position shifted forward therefrom and extends along the same rear end; and said first and second units together being substantially coextensive in length and width with said computer body so that said first and second units may be pivoted to a position in which said first and second units cover all of the top face of said computer body.

16. The computer system as claimed in claim 15, wherein said display device displays first information and said auxiliary device comprises a visual indicator adapted to displaying second information, and second information being the same or different than said first information.

* * * * *